US008391293B2

(12) United States Patent
Srinivasan et al.

(10) Patent No.: US 8,391,293 B2
(45) Date of Patent: Mar. 5, 2013

(54) TRANSPORTING X.25-OVER-ISDN THROUGH IP, USING CUGS/PROTOCOL TRANSLATION

(75) Inventors: Ramesh Srinivasan, San Jose, CA (US); Eman B. Schaffer, Ridgefield, CT (US); Stephen Canby, San Jose, CA (US); Jose Martin Ruiz, Fremont, CA (US); Subramaniam Mahadevan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 532 days.

(21) Appl. No.: 12/023,823

(22) Filed: Jan. 31, 2008

(65) Prior Publication Data

US 2009/0196299 A1 Aug. 6, 2009

(51) Int. Cl.
*H04L 12/28* (2006.01)
*H04J 3/16* (2006.01)
*H04J 3/22* (2006.01)

(52) U.S. Cl. .................... 370/395.63; 370/466; 370/469
(58) Field of Classification Search .................. None
See application file for complete search history.

(56) References Cited

U.S. PATENT DOCUMENTS

| | | | | |
|---|---|---|---|---|
| 6,018,770 | A * | 1/2000 | Little et al. ..................... | 709/223 |
| 6,226,676 | B1 * | 5/2001 | Crump et al. ................. | 709/227 |
| 7,092,389 | B2 * | 8/2006 | Chase et al. .................. | 370/389 |
| 7,277,442 | B1 | 10/2007 | Holmgren et al. | |
| 8,000,344 | B1 * | 8/2011 | Frick ............................. | 370/466 |
| 2003/0035439 | A1 | 2/2003 | Watanabe et al. | |
| 2004/0052257 | A1 | 3/2004 | Abdo et al. | |
| 2005/0060543 | A1 * | 3/2005 | Anspach ....................... | 713/165 |
| 2006/0002386 | A1 * | 1/2006 | Yik et al. ....................... | 370/389 |
| 2006/0120402 | A1 * | 6/2006 | Gallant ......................... | 370/466 |
| 2007/0211717 | A1 * | 9/2007 | Capps et al. .................. | 370/389 |
| 2008/0159292 | A1 * | 7/2008 | Jiang et al. .................... | 370/392 |
| 2009/0144818 | A1 * | 6/2009 | Kumar et al. .................. | 726/13 |

FOREIGN PATENT DOCUMENTS

WO WO-2007103608 A2 9/2007

OTHER PUBLICATIONS

X.25 Closed User Groups, Cisco IOS Release 12.0(7)T, referenced in X.25 Frequently Asked Questions dated Dec. 12, 2007.*
X.25 Frequently Asked Questions, Document ID: 18327, Dec. 12, 2007.*

(Continued)

*Primary Examiner* — Faruk Hamza
*Assistant Examiner* — Cassandra Decker
(74) *Attorney, Agent, or Firm* — Schwegman, Lundberg & Woessner, P.A.

(57) ABSTRACT

In one example embodiment, the method includes receiving an X.25 packet at a LAN interface of a network device. Further, the method includes determining whether a local CUG value is associated with the X.25 packet. The local CUG value may be replaced with a network CUG value associated with the X.25 packet. Thereafter, the X.25 packet, and the associated network CUG value, may be formatted to generate an IP packet. The formatting may include the use of at least one formatting regime including encapsulating the X.25 packet, that includes the associated network CUG value, in an XOT, or using protocol translation to translate the X.25 packet that includes the network CUG value into an equivalent IP packet. The method includes transmitting the IP packet using a WAN interface card, the WAN interface card including a primary interface, and at least one backup interface.

29 Claims, 14 Drawing Sheets

OTHER PUBLICATIONS

"Cisco ADSL2 and ADSL2+ High-Speed WAN Interface Cards for the Cisco 1841 Integrated Services Router and the Cisco 2800 and 3800 Series Integrated Services Router", *Cisco Systems Data Sheet*, (2006), 8 pgs.

"Eicon 1550 WAN Router", [online]. Copyright © 2006 Dialogic Corporation. [retrieved Aug. 27, 2007]. Retrieved from the Internet: <URL: http://www.eicon.com/worldwide/products/WAN/Eicon_1550_1551_WAN_Router.htm>, 1 pg.

"X.25 Migration Solutions", [online]. Copyright © 2006 Dialogic Corporation. [retrieved Aug. 27, 2007]. Retrieved from the Internet: <URL: http://www.eicon.com/worldwide/solutions/x.25_Migration.htm>, 1 pg.

"European Application Serial No. 09151826.6, Extended European Search Report mailed Jun. 9, 2009", 7 pgs.

* cited by examiner

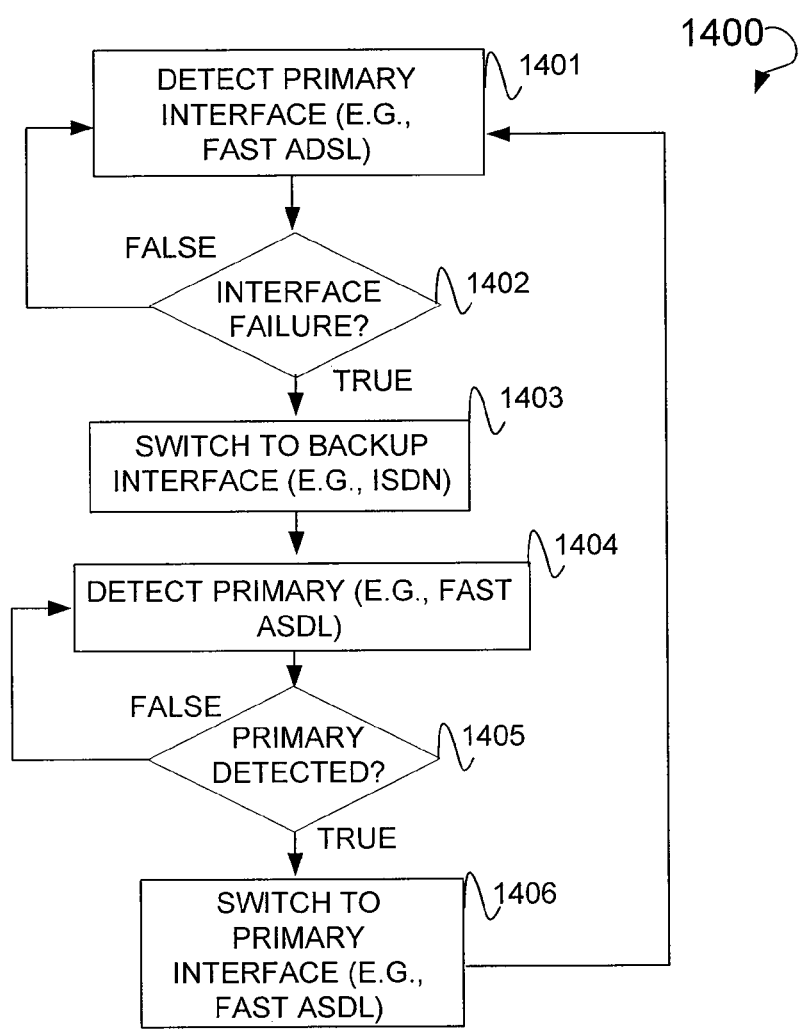

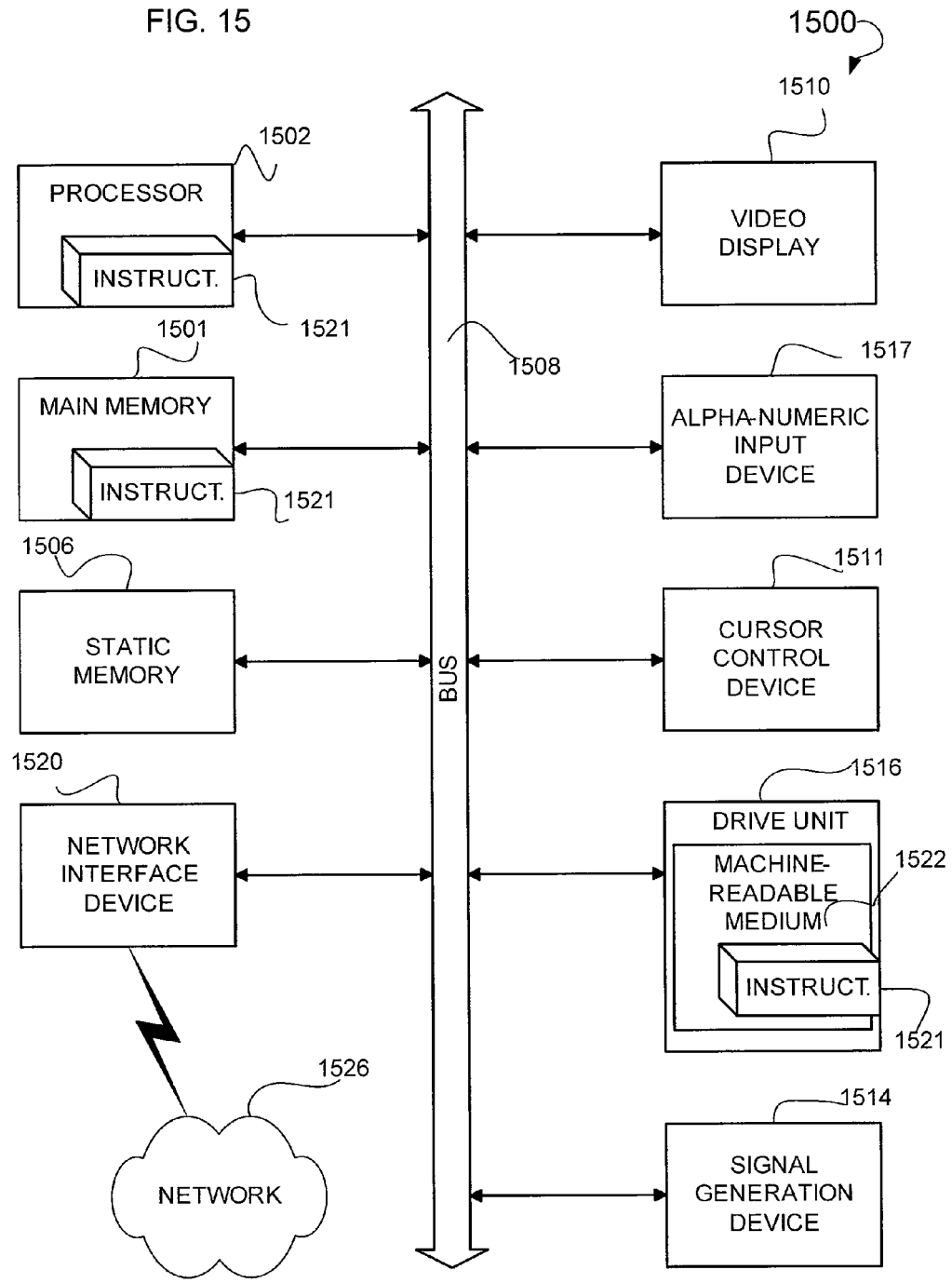

TRANSPORTING X.25-OVER-ISDN THROUGH IP, USING CUGS/PROTOCOL TRANSLATION

FIELD

This application relates to a device and method for using network protocols.

BACKGROUND

X.25 is an International Telecommunication Union-Telecommunication Standardization Sector (ITU-T) standard protocol suite for connecting to packet switched Wide Area Networks (WAN) that use, for example, leased lines and a Integrated Services Digital Network (ISDN) system as the networking hardware. Devices utilizing the X.25 protocol suite include Data Terminal Equipment (DTE), Data Circuit-Terminating Equipment (DCE), and a Packet Switching Exchange (PSE). The X.25 protocol suite may be utilized in conjunction with any one of a number of other protocols and associated networks including the Transmission Control Protocol (TCP), Internet Protocol (IP) (collectively TCP/IP), an Asymmetric Digital Subscriber Line (ADSL), or ISDN.

BRIEF DESCRIPTION OF DRAWINGS

Embodiments are illustrated by way of example and not limitation in the figures of the accompanying drawings, in which like references indicate similar elements and in which:

FIG. 14 is a flow chart illustrating a method, according to an example embodiment, for switching from a primary interface to a backup interface.

FIG. 15 shows a diagrammatic representation of machine, according to an example embodiment, in the form of a computer system.

DESCRIPTION OF EXAMPLE EMBODIMENTS

Figure 1:
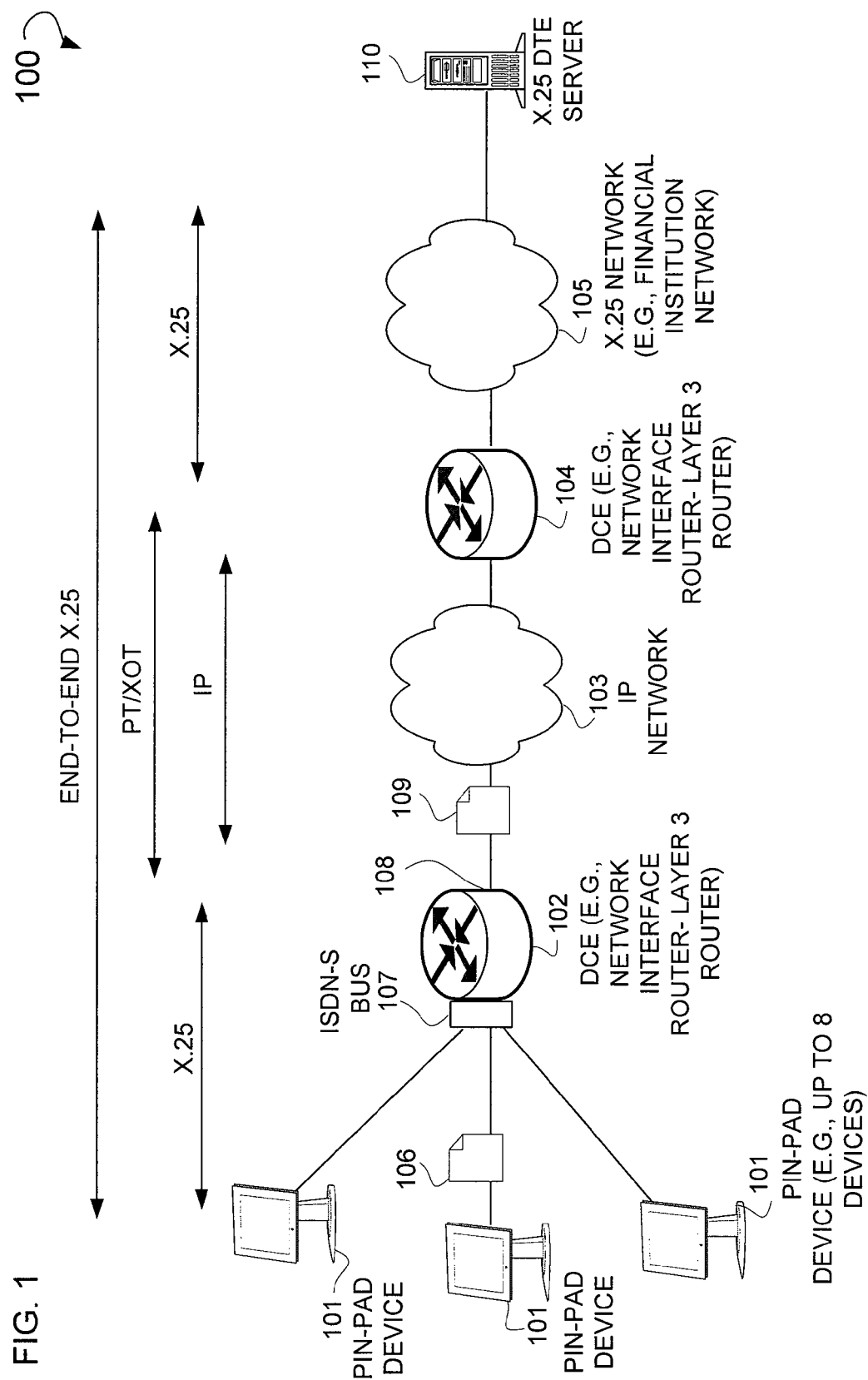
FIG. 1 is a diagram of a system, according to an example embodiment, illustrating a DCE that may be used to transmit an X.25 packet, possibly including a Closed User Group (CUG) value, over an IP network.

In the following description, for purposes of explanation, numerous specific details are set forth in order to provide a thorough understanding of an embodiment of the present method and device. It may be evident, however, to one skilled in the art, that the present method and device may be practiced without these specific details.

Overview

In one example embodiment, a device and method for generating an IP packet including an X.25 packet with a network CUG is shown. The method may include receiving an X.25 packet at a Local Area Network (LAN) interface of a network device. Then, a determination is made as to whether a local CUG value is associated with the X.25 packet, the local CUG value identifying a device associated with a device group. The local CUG value is replaced with a network CUG value associated with the X.25 packet, the network CUG value used to identify the X.25 packet as associated with a domain.

In another example embodiment, a device and method is used to receive an Internet Protocol (IP) packet. Then, the device and method is used to identify the validity of a network Closed User Group (CUG) value contained within the IP packet, the network CUG value converted back into a local CUG value. The device and method may be used to identify data associated with a device group based upon the network CUG value.

Example Embodiments

In some example embodiments, a method and device is shown to provide a solution for transporting the X.25 packet over ISDN frames seamlessly through a network using IP. In one example embodiment, D channel ISDN frames may be used. The device and method may, for example, include the ability to classify and protect the X.25 packets through assignment of an appropriate CUG value. This CUG value may be a numeric value ranging from 0-10,000 and may be used to control access to a network utilizing the X.25 protocol suite (referenced hereafter as an X.25 protocol). This CUG value may be part of an X.25 header, or an X.25 XOT header. Further, this CUG value may be part of the payload (e.g., a user data field) associated with an X.25 packet. This header may be a header generated as part of the X.25 protocol. As will be more fully discussed below, this CUG value may be mapped to other CUG values, IP addresses, or other unique identifier information. Some example embodiments may or may not include the use of a separate DTE during the course of assigning an appropriate CUG value.

In certain example embodiments, the X.25 packets with CUGs may be translated/encapsulated, placed into an IP packet, and transported across the network as an IP packet to the destination X.25 network. The process for translation/encapsulation may be referred to as a formatting regime. This IP packet may then be translated/mapped back to generate the original X.25 packet along with its CUG information. This process of translation/mapping back may be referred to as conversion. In cases where a DTE not capable of generating a CUG is used, a router may be used to generate the CUG value. A DTE may be a device associated with a device group, a device group being a predefined collection of DTEs.

In some example embodiments, a router capable of generating a CUG may be used. This router may be a layer 3 device as understood in the Open Systems Interconnection (OSI) model, or TCP/IP protocol stack model. Further, some other suitable network appliance (e.g., a network device) may be used in lieu of a router including a switch, bridge or other suitable device capable of layer 1, 2, or 3 analysis and processing.

In one example embodiment, a router with an ISDN-Network side Termination (e.g., ISDN-NT) at a customer premises may be utilized such that either a protocol translation of the X.25 data into an IP packet, or encapsulation of the X.25 data in an IP Packet (e.g., using XOT) takes place. Specifically, in an XOT solution, the original X.25 packet is fully encapsulated in the TCP segment and the CUG field value is available and recovered when the X.25 packet is extracted from the TCP segment at the destination device. This destination device may be a server at a financial institution. Further, in certain example cases, an INTERNETWORK OPERATING SYSTEM™ (IOS)-XOT implementation may be coupled with a configuration of the network terminating BRI D-channel interface in DCE mode. Such a configuration may provide the capability to: (a) assign a CUG value to the X.25 packet in the ISDN D-channel interface, if the X.25 packet does not have a CUG value assigned, (b) to map the CUG value assigned (e.g., a local CUG) to an appropriate network CUG value if used by the end X.25 network, prior to being encapsulated within a TCP segment.

Some example embodiments may include the use of protocol translation wherein the X.25 packet is converted into an IP packet, and the X.121 address, along with Closed User Data (CUD) in the originating X.25 packet, is used to map to the corresponding appropriate destination IP address. Functionality provided as part of IOS may be used in this embodiment such that a Virtual Terminal (e.g., VTY) is created to accomplish the protocol translation of the incoming X.25 packets. In some example embodiments, these X.25 packets can be assigned an appropriate CUG value, if no CUG is assigned to the X.25 packet being translated.

In some example embodiments, a network CUG value may be mapped to a local CUG value. For example, in one example embodiment, an incoming CUG value included within an X.25 packet may be mapped to a second CUG. The incoming CUG value may be a local CUG value or a network CUG value. Further, in some example embodiments, the second CUG value may be a local CUG value or a network CUG value.

In some example embodiments, the router used to encapsulate the X.25 packets including a CUG value may have a multi-port interface card (e.g., a WAN interface card) associated with the router. For example, a multi-port interface card with multiple disparate access technologies is shown. Disparate may mean containing or made up of fundamentally different and often incongruous elements. One of these interface cards may provide a backup WAN access connection (e.g., a secondary connection) should the primary connection fail. In one example embodiment, the primary connection is an ADSL interface, and the secondary (e.g., backup) connection is an ISDN interface. Some example embodiments may include the use of a multi-port single wide interface card, wherein the number of ports can be greater than 2. In some example embodiments, a specific instance of a possible 3-port single wide interface card supporting disparate access technologies is shown.

FIG. 1 is a diagram of an example system 100, illustrating a DCE that may be used to transmit an X.25 packet including a CUG value over an IP network. Some example embodiments may include the encapsulating of the X.25 packet, and associated CUG value, using another protocol such as XOT. In some example embodiments, this system 100 may be used to translate the X.25 packet, and associated CUG value, into an equivalent protocol representation. Illustrated is a PIN-PAD device(s) 101 that may or may not be a dumb device(s) that does or does not generate a CUG value. Up to eight (8) PIN-PAD devices may be used in conjunction with the example system 100. Collectively, these PIN-PAD devices 101 may be referred to as a group of devices. In some example embodiments, the PIN-PAD device 101 is a DTE (e.g., a device associated with a group). This CUG value may denote a particular user group utilizing the PIN-PAD device 101. This PIN-PAD device 101 may be a device associated with a device group that is part of a domain, and may be a PoS device. The domain may include one or more of these PIN-PAD devices 101, and may be a LAN or other network type utilized by a retailer. The device group or domain may be identified by a CUG value. Additionally, a domain may be a X.25 network operated by a financial institution.

In one example embodiment, a user using the PIN-PAD device 101 may generate an X.25 packet 106. X.25 packet 106 may, for example, be then sent across an ISDN-D channel connection. Included within this X.25 packet 106 may be, for example, financial data that includes a credit card number, a PIN number, an expiration date, or some other suitable data. In some example embodiments, this data may be associated with a credit card based transaction, or other type of electronic transaction. This X.25 packet 106 may be received by, for example, an ISDN-S bus 107 that resides as a part of a DCE 102. This ISDN-S bus 107 may provide an interface to a LAN, within which resides the PIN-PAD device 101. This DCE 102 may be some type of network device such as a layer 3 router, or other suitable device.

As will be more fully described below, once this X.25 packet 106 is received by the DCE 102, the DCE 102 may identify whether or not a CUG value is already associated with X.25 packet 106 and, if the value is not associated with the X.25 packet 106, the DCE 102 may assign a CUG value to the X.25 packet 106. Further, this DCE 102 may identify whether or not the X.25 packet 106 needs to be translated using some type of Protocol Translation (PT) functionality. The DCE 102 may identify whether or not the X.25 packet 106 needs to be encapsulated in an XOT header.

Still further, as will be more fully described below, in cases where the PIN-PAD device 101 has assigned a CUG value to the X.25 packet 106, a mapping may occur between the CUG value assigned by the PIN-PAD device 101, and a network CUG value. This network CUG value may be understood by the DCE 102. Once these various operations are performed, the DCE 102 may transmit an encapsulated IP packet 109 across an IP network interface. This IP network interface, referenced herein as an interface card 108 (e.g., a WAN interface card), may allow the DCE 102 to interface with an IP network 103. This interface card 108 may facilitate the transmission of an IP packet over a network utilizing various protocols such as ADSL, or some other suitable Digital Subscriber Line (DSL) based protocol. Further, a Data Over Cable Service Interface Specification (DOCSIS) base protocol may be utilized by the interface card 108.

The encapsulated IP packet 109 may be transmitted across an IP network 103 to be received by, for example, a DCE 104. This DCE 104 may also be some type of suitable network appliance such as, for example, a layer 3 router. This DCE 104 may then provide an interface to allow for the encapsulated IP packet 109 to be sent to, or across, an X.25 network 105. This X.25 network 105 may be a network utilized by some type of financial institution. The X.25 network 105 may be a domain that uses a network CUG value to identify an X.25 packet (e.g., the X.25 packet as associated with a domain). Further, a X.25 DTE server 110 may reside as part of the X.25 network 105.

In some example embodiments, this DCE 104 may, for example, disassemble the IP packet 109 to extract the X.25 packet 106. Further, in another example embodiment, the DCE 104 may engage in some form of protocol translation so as to translate the IP packet 109 into an equivalent X.25 packet 106. Additionally, the DCE 104 may extract financial data including a credit card number, a PIN number, an expiration date, or some other suitable data from the equivalent X.25 packet 106 and transmit this financial data across the X.25 network 105. This financial data may then be processed by the X.25 DTE server 110 to identify, for example, the validity of the financial data. Determining validity may involve recognizing a credit card number, a PIN number, or other suitable bases for validity determining validity.

Figure 2:
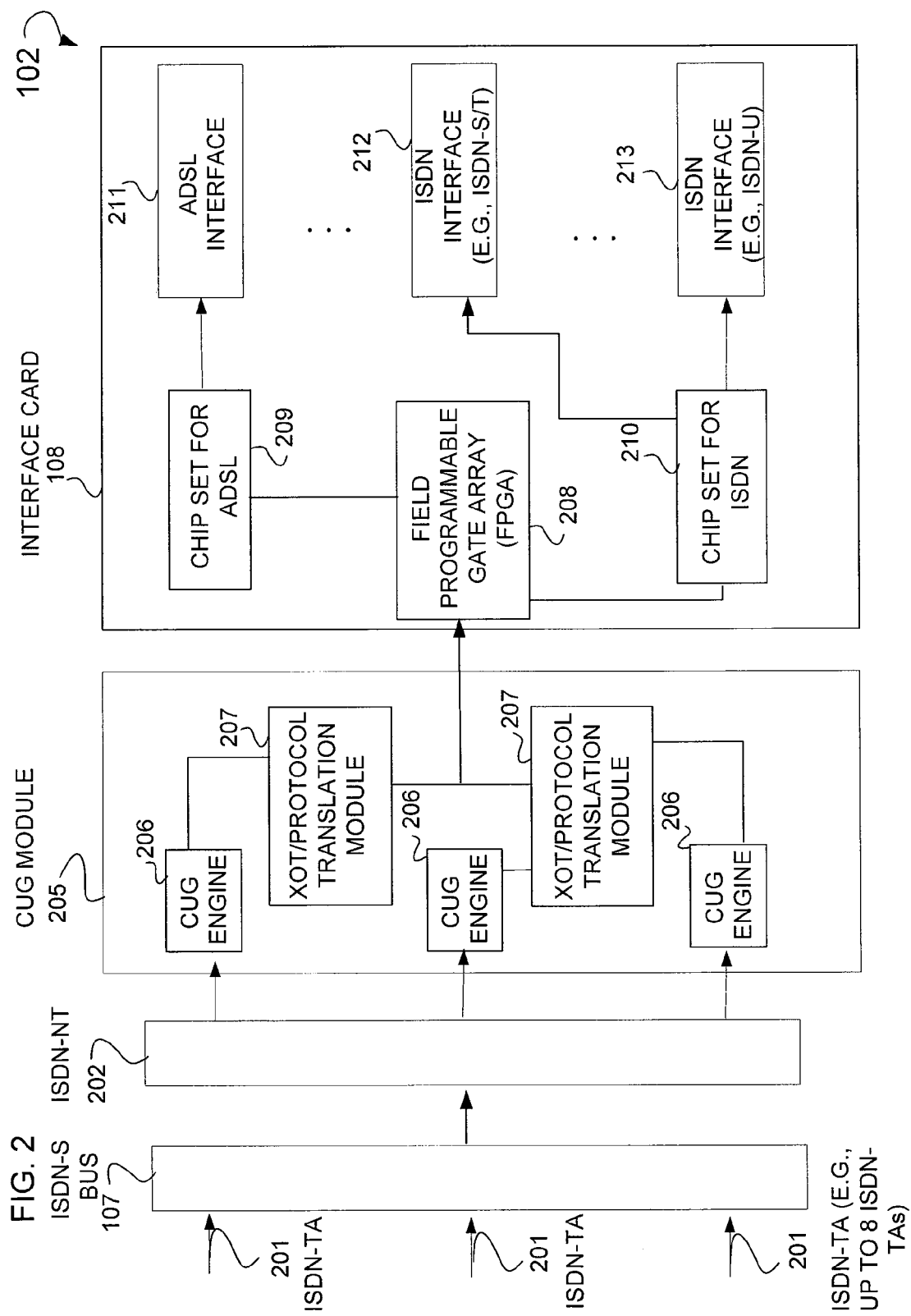
FIG. 2 is a block diagram of a DCE, according to an example embodiment, showing various interfaces.

FIG. 2 is a blocked diagram of an example DCE 102. While the various blocks, and associated functionality depicted herein, are disclosed as being a part of a DCE 102, these various blocks and associated functionality could be part of any device (e.g., computer system) requiring a WAN interface. Shown are various (e.g., up to 8 total) ISDN-Terminal Adaptors (e.g., ISDN-TA) 201 operatively connecting the PIN-PAD devices(s) 101 to the DCE 102. Further, shown is the ISDN-S bus 107, operatively connected to the ISDN-NT 202. This ISDN-S bus 107 may be utilized by the DCE 102. Also shown is a CUG module 205. Residing within this CUG module 205 is a number of blocks, including various CUG engines 206, and XOT/Protocol Translation modules 207. Some example embodiments may utilize a plurality of the modules (e.g., 206 and 207) whereas another example embodiment only utilizes a single CUG engine 206, and a single XOT/Translation module 207. As will be more fully described below, in some example cases, the CUG engine 206 assigns a local CUG value to an incoming X.25 packet 106, or maps an existing local CUG value, assigned by a PIN-PAD device 101, to a network CUG.

Also shown is the interface card 108 where this interface card may provide for an IP network interface. Part of this interface card 108, may be a chip set for an ASDL 209, a Field Programmable Gate Array (FPGA) 208, and a chip set for an ISDN 210. This FPGA 208 may receive a encapsulated IP packet 109 from the CUG module 205. Then, the FPGA 208 may, based upon the interface availability of the various interfaces, assign this encapsulated IP packet 109 to the chip set for ADSL 209, or the chip set for ISDN 210. Operatively connected to this chip set for ADSL 209 is an ADSL Interface 211 (e.g., a primary interface). Further, an ISDN Interface 212, which, in this case, is an ISDN-S/T interface, is operatively connected to the chip set for ISDN 210. Additionally, operatively connected to the chip set for ISDN 210 is an ISDN Interface 213 where this ISDN Interface 213 may be forwarded to, for example, ISDN-U. ISDN-S/T is an interface common in various European countries, whereas ISDN-U is interface common in various North American countries. In contrast to the ADSL Interface 211, the ISDN interfaces 212, and 213 may be backup interfaces.

In some example embodiments, the interface card 108 is part of a WAN form factor. This form factor may have a height of 1.92 cm, a width of 7.82 cm, and a depth of 12.04 cm. Additionally, in some example embodiments, where the interface card 108 is to be supported in a single form factor, the form factor may have dimensions of 3.9 cm (Height), 18.0 cm (Width), and 18.3 cm (Depth). The determination of height, width, and depth for the interface card may, in some example embodiments, be determined based upon empirical testing, and/or modeling.

Figure 3:
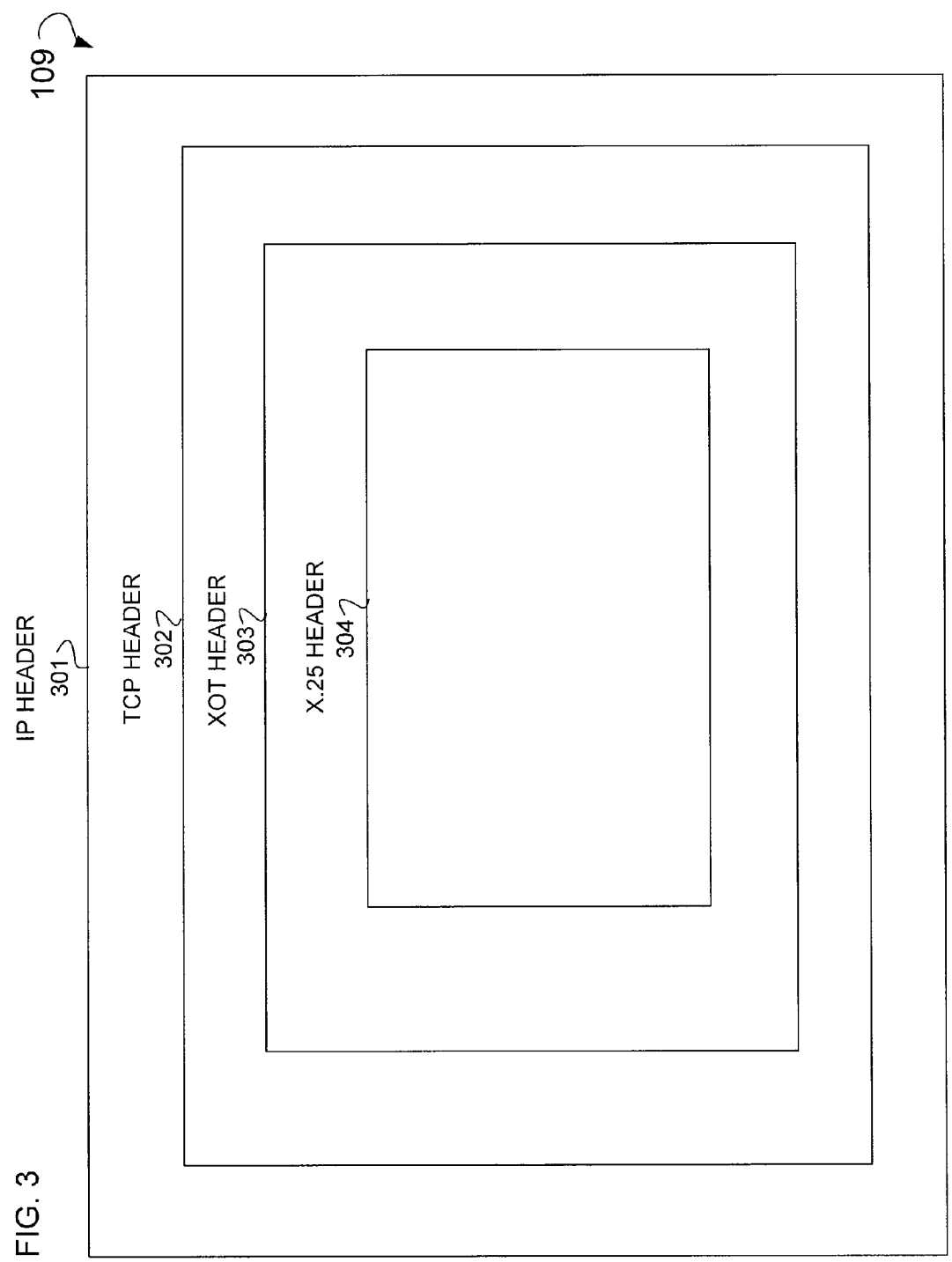
FIG. 3 is a diagram of an IP packet, according to an example embodiment, generated through the use of X.25 Over Transmission Control Protocol (TCP) (XOT) encapsulation.

FIG. 3 is a diagram of an example encapsulated IP packet 109 generated through the use of XOT encapsulation. Shown is an IP header 301. Included within this IP header 301 is a TCP header 302. Included within this TCP header 302 is an XOT header 303. Included within this XOT header 303 is an X.25 header 304. The various headers illustrating this example embodiment of a encapsulated IP packet 109 may result from, for example, the use of XOT encapsulation as opposed to protocol translation. Protocol translation will be more fully illustrated below.

Figure 4:
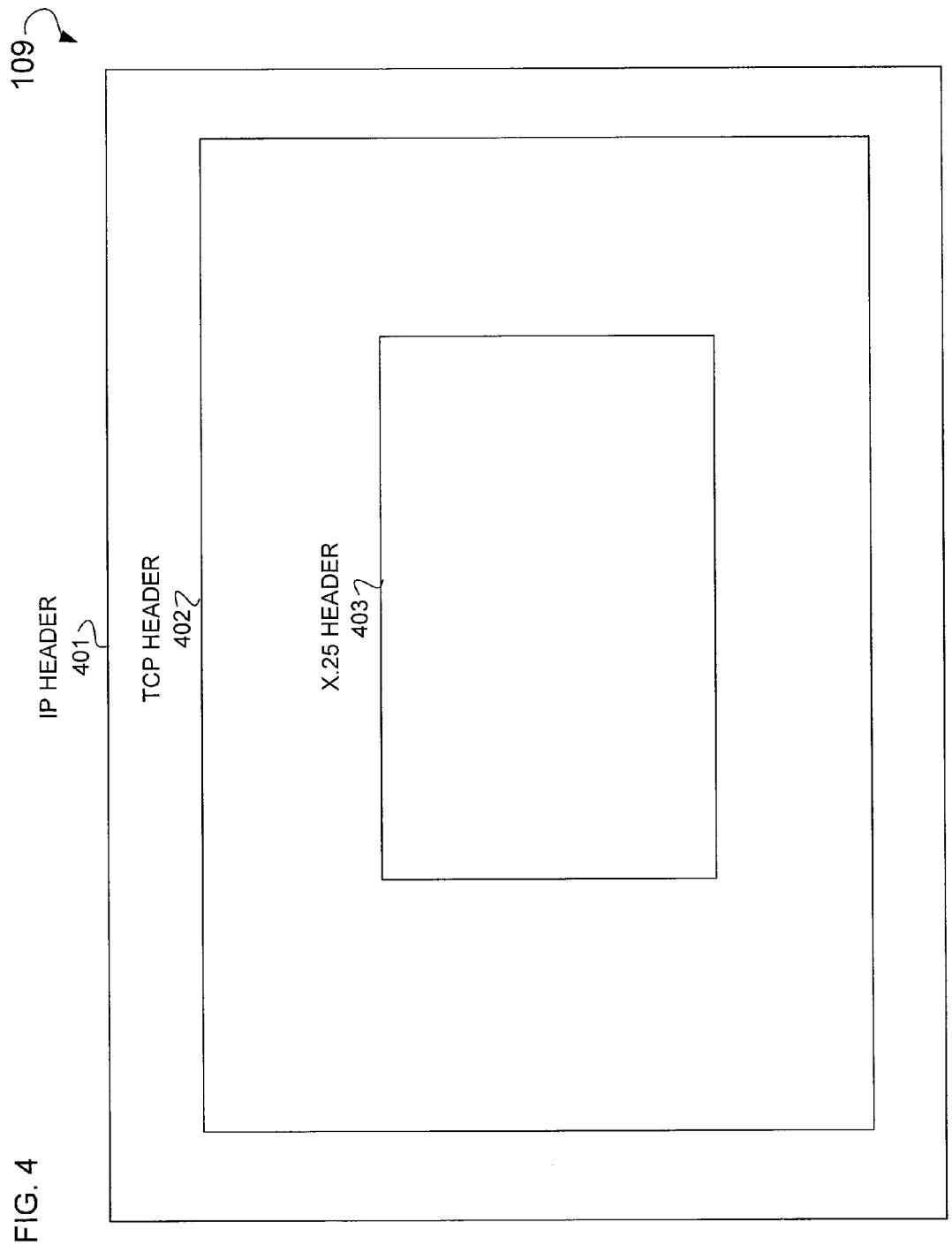
FIG. 4 is a diagram of an IP packet, according to an example embodiment, that is generated through the use of protocol translation.

FIG. 4 is a diagram of an example translated IP packet 109 generated through the use of protocol translation. Included within this IP header 401 is a TCP header 402. Included within this TCP header 402 is an X.25 header 403. In some example embodiments, this X.25 header 403 is translated to form an equivalent payload of a TCP header 402. And, in still other example embodiments, in lieu of utilizing the TCP header 402, a User Datagram Protocol (UDP) based header may be used and the X.25 header 403 included as an equivalent payload of this UDP header.

Figure 5:
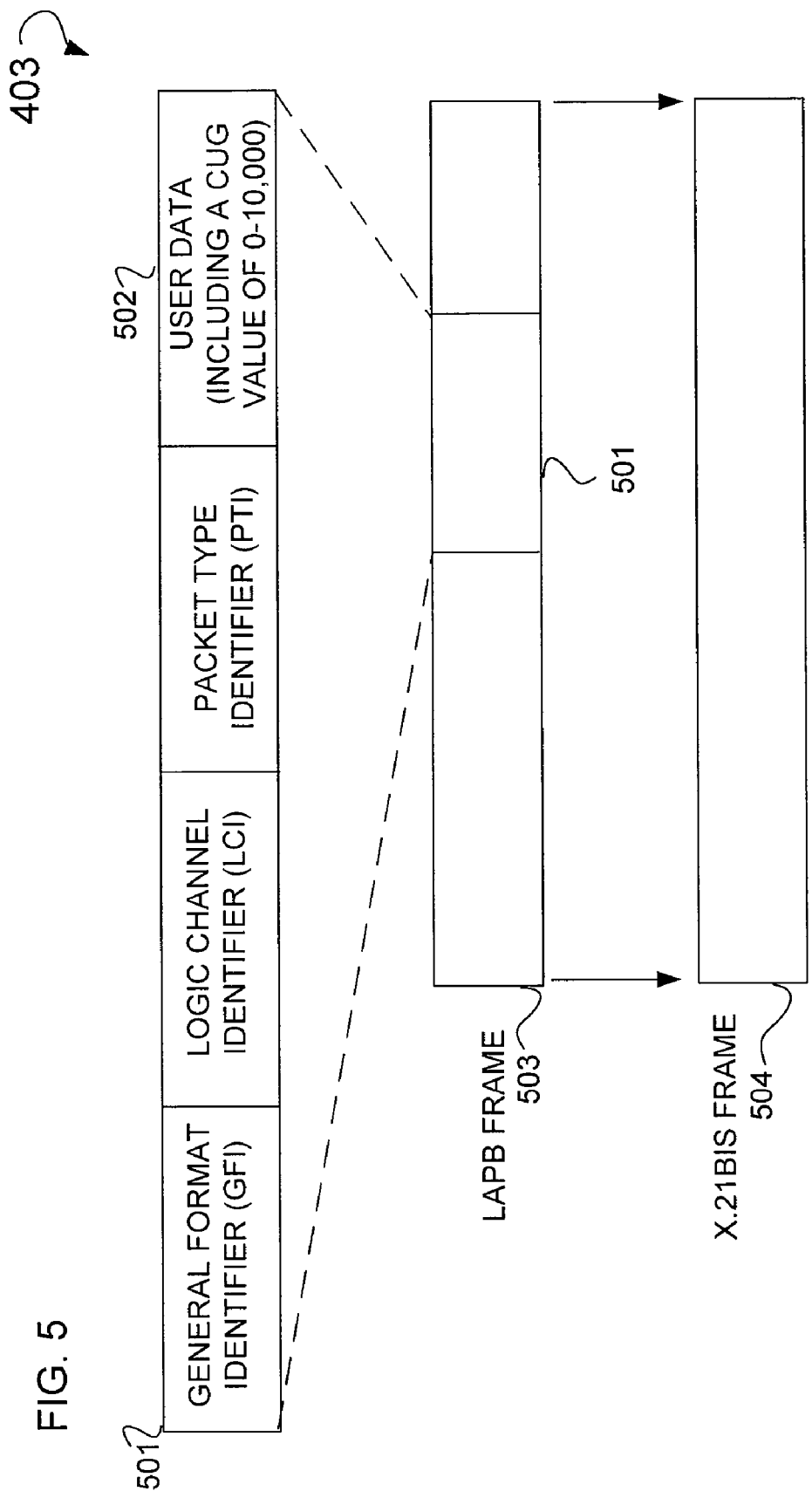
FIG. 5 is a diagram of an X.25 header, according to an example embodiment, that includes a Packet Layer Protocol (PLP) header.

FIG. 5 is a diagram of an example X.25 header 403. Shown is a Packet Layer Protocol (PLP) header 501. Included within this PLP header 501 is a field 502 including user data. As a part of this user data, a CUG value may be placed within this field 502. This CUG value may have a value in the range of between 0 and 10,000. This PLP header may, in turn, be made a part of a Link Access Procedure Balanced (LAPB) frame 503. This LAPB frame 503 may, for example, be some type of layer 2 frame or header. Further, this LAPB Frame 503 may then be encapsulated in a X.21 BIS Frame 504, where this X.21 BIS Frame 504 may be some type of layer 1 frame.

Figure 6:
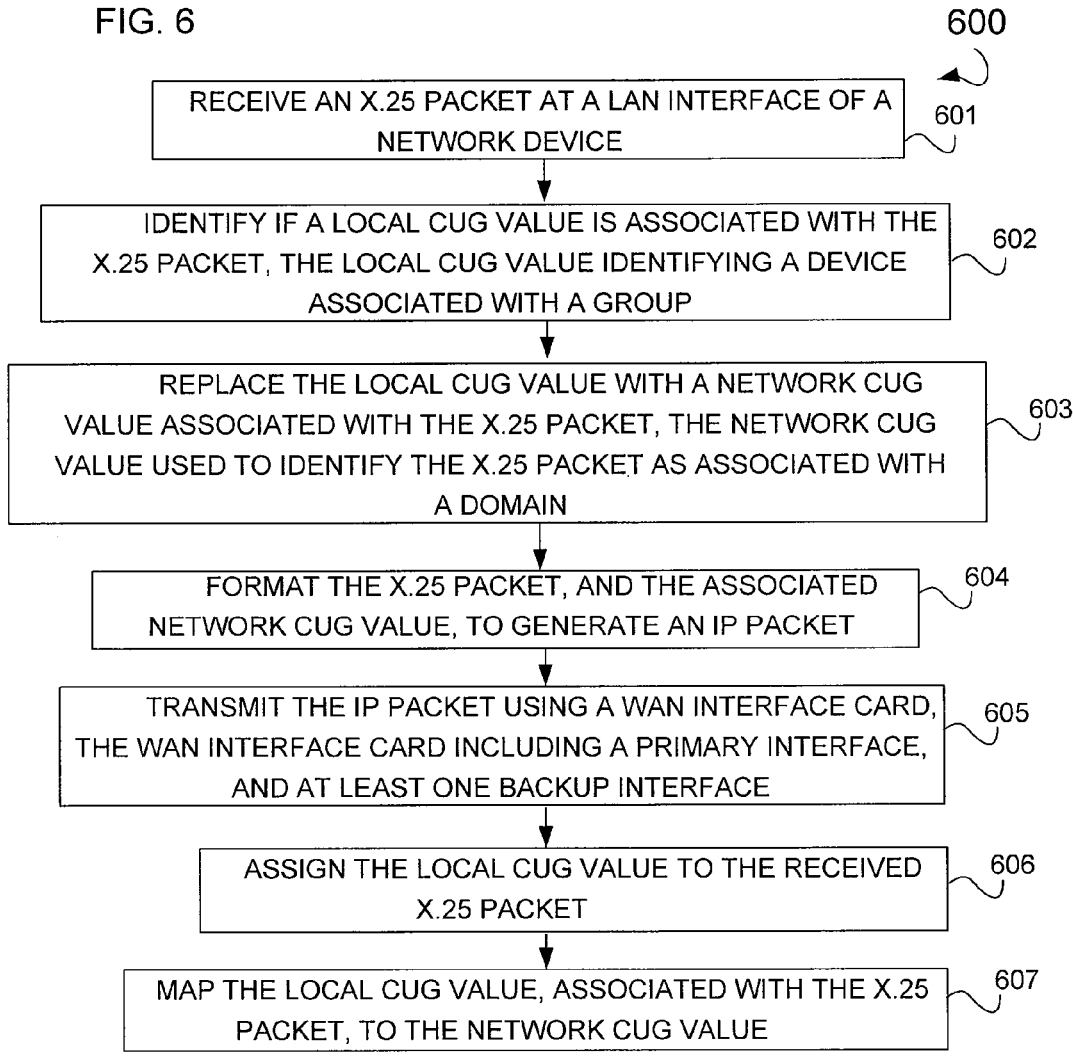
FIG. 6 is a flow chart showing a method, according to an example embodiment, for generating an IP packet including an X.25 packet with a network CUG.

FIG. 6 is a flow chart showing an example method 600 for generating an encapsulated data packet. Various operations are shown that may reside on, for example, the DCE 102 or DCE 104. An operation 601 is shown, that when executed facilitates the receiving of an X.25 packet at a LAN interface (e.g., ISDN-S bus 107) of a network device. An operation 602 is shown that, when executed, identifies if a local CUG value is associated with the X.25 packet, the local CUG value identifying a device associated with a group. Further, an operation 603 is executed that replaces the local CUG value with a network CUG value associated with the X.25 packet, where the network CUG value is used to identify the X.25 packet as associated with a domain (e.g., X.25 network 105). Additionally, an operation 604 is shown that when executed formats the X.25 packet, and the associated network CUG value, to generate an IP packet (e.g., IP packet 109). The formatting may include the use of at least one formatting regime including encapsulating the X.25 packet, that includes the associated network CUG value, in XOT, or using protocol translation to translate the X.25 packet that includes the network CUG value into an equivalent IP packet. An operation 605 is executed to transmit the IP packet using a WAN interface card (e.g., interface card 108), where the WAN interface card includes a primary interface, and at least one backup interface.

In some example embodiments, the LAN interface is an ISDN-NT interface. An operation 606 may be executed to assign the local CUG value to the received X.25 packet. Additionally, an operation 607 may be executed to map the local CUG value, associated with the X.25 packet, to the network CUG value. Moreover, the protocol translation may include mapping at least one field in an X.25 header to at least one equivalent field in an IP header, and/or TCP header. Further, the WAN interface card (e.g., interface card 108) may include at least two or more disparate WAN interfaces comprising disparate access technologies including at least two or more of the following: ADSL, ADSL2, ADSL2+, Cable, a Very High Speed Digital Subscriber Line (VDSL), or ISDN. Also, in some example embodiments, the two or more disparate WAN interfaces are included in the same form factor. Some example embodiments may include, the form factor have dimensions including: a height of 1.92 cm, a width of 7.82 cm, and a depth of 12.04 cm, or a height of 3.9 cm, a width of 18.0 cm, and a depth of 18.3 cm.

Figure 7:
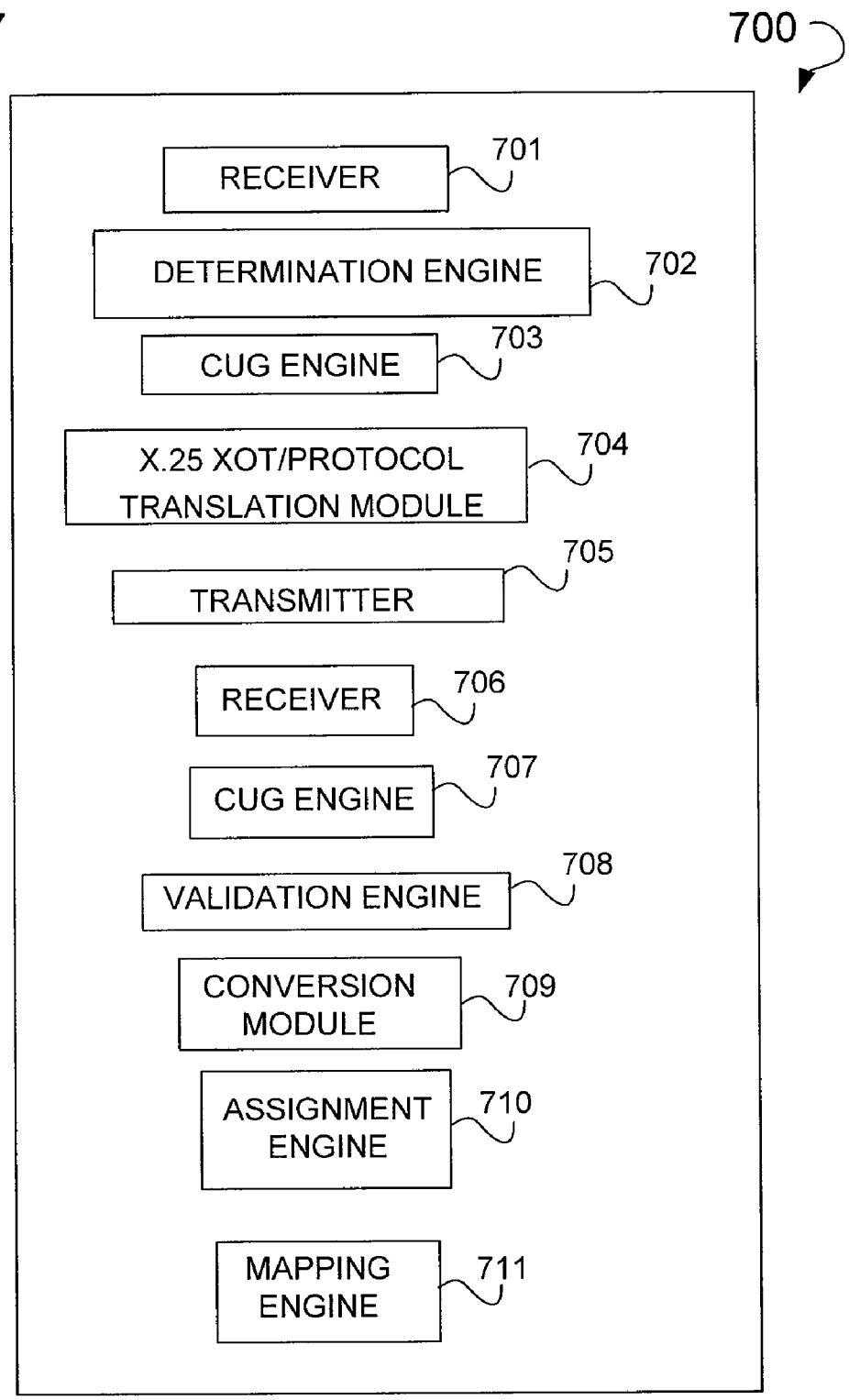
FIG. 7 is a block diagram of a computer system, according to an example embodiment, used to generate an IP packet including an X.25 packet with a network CUG.

FIG. 7 is a block diagram of an example computer system 700 used to generate an encapsulated data packet. This computer system 700 may include a router, such as DCE 102, DCE 104 or X.25 DTE server 110. The blocks disclosed herein may be implemented in hardware, firmware, or software. In some example embodiments, a receiver 701 is implemented to receive an X.25 packet at a LAN interface of a network device. A determination engine 702 may be implemented to identify if a local CUG value is associated with the X.25 packet, the local CUG value identifying a device associated with a group. A CUG engine 703 may be implemented to replace the local CUG value with a network CUG value associated with the X.25 packet, where the network CUG value is used to identify the X.25 packet as associated with a domain. In some example embodiments, CUG engine 703 and 206 are equivalent. Further, an X.25 XOT/Protocol Translation module 704 may be implemented to format the X.25 packet, and the associated network CUG value, to generate an IP packet. The formatting may include the use of at least one formatting regime including encapsulating the X.25 packet (e.g., XOT), or using protocol translation to translate the X.25 packet into an equivalent IP packet. XOT/Protocol Translation module 704 may be equivalent to XOT/Protocol translation module 207. Additionally, a transmitter 705 may be implemented to transmit the IP packet using a WAN interface card, the WAN interface card including a primary interface, and at least one backup interface. Transmitter 705 may be part of interface card 108. A receiver 706 may be implemented to receive an IP packet 109. A CUG engine 707 may be used to identify if a network CUG value is valid. The network CUG value may be converted back into a local CUG value. This local CUG value may be an appropriate CUG value, and may not be the same local CUG value as previously utilized. A validation engine 708 may be used to identify data associated with a device group based upon the network CUG value. A conversion module 709 may be used to convert the IP packet to an equivalent X.25 packet, the converting using at least one conversion regime including extracting the X.25 packet from the IP packet, or translating the IP packet into an equivalent X.25 packet. In some example embodiments, the data includes financial data.

In some example embodiments, the LAN interface is an ISDN-NT interface. An assignment engine 710 is disclosed to assign the local CUG value to the received X.25 packet. Additionally, a mapping engine 711 may be implemented to map the local CUG value, associated with the X.25 packet, to the network CUG value. Further, the protocol translation may include mapping at least one field in an X.25 header to at least one equivalent field in an IP header, and/or TCP header. Assignment engine 710 and mapping engine 711 may be part of XOT/Protocol Translation Modules 704 or 207. Moreover, the WAN interface card may include at least two or more disparate WAN interfaces comprising disparate access technologies including at least two or more of the following: ADSL, ADSL2, ADSL2+, Cable, VDSL, or a ISDN. The two or more disparate WAN interfaces may be included in the same form factor. Also, the form factor may have dimensions including at least one of the following dimensions: a height 1.92 cm, a width of 7.82 cm, and a depth of 12.04 cm, or a height of 3.9 cm, a width of 18.0 cm, and a depth of 18.3 cm.

Figure 8:
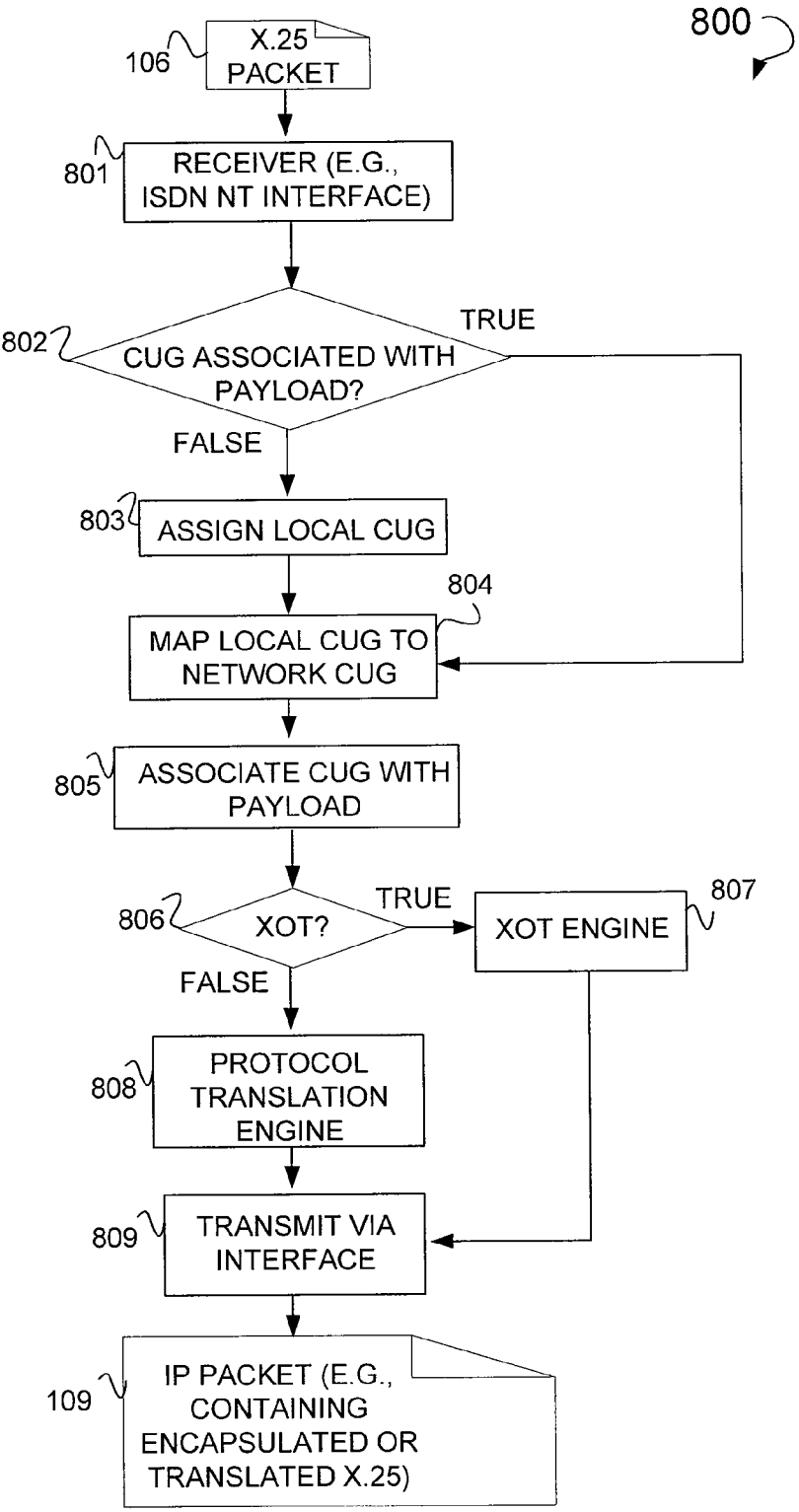
FIG. 8 is a flow chart illustrating a method, according to an example embodiment, for generating an IP packet including an X.25 packet with a network CUG.

FIG. 8 is a flow chart illustrating an example method 800 used to generate an IP packet 109 including an X.25 packet with a network CUG. Illustrated are various operations 801 through 810, and related operations (see e.g., FIGS. 9 through 12), that may reside as part of the DCE 102 or DCE 104. Shown is an X.25 packet 106, wherein this X.25 packet 106 may be generated by, for example, a PIN-PAD device 101. An operation 801, when executed, receives this X.25 packet 106 where this operation 801 may reside as a part of, for example, an ISDN-S bus 107. A decisional operation 802 may be executed that identifies if a CUG value is associated with the X.25 packet 106.

In cases where the decisional operation 802 evaluates as "false," a further operation 803 is executed. This operation 803 may assign a local CUG value to the X.25 packet 106. In cases where decisional operation 802 evaluates to "true," an operation 804 may be executed. Operation 804 may, when executed, map the local CUG value included in the X.25 packet 106 to a network CUG value. An operation 805 may be executed that associates the network CUG value with a payload in the form of an X.25 packet 106. In some example embodiments, the network CUG value replaces the local CUG value.

In some example embodiments, a network administrator or other suitable person may pre-configure the DCE 102 and DCE 104 to encapsulate the X.25 packet 106 using XOT, or to translate the X.25 packet 106 using protocol translation. This pre-configuration is represented here as a decisional operation 806. The decisional operation 806 may be executed to identify whether or not the X.25 packet 106, and associated CUG value, is to be encapsulated using XOT. In cases where decisional operation 806 evaluates as "true," an XOT engine 807 may be executed. Cases where decisional operation 806 evaluates as "false," an operation 808 may be executed that engages in some type of protocol translation translating the X.25 packet 106, and associated CUG value, into some other equivalent format and protocol associated therewith. An operation 809 may be executed that transmits the XOT encapsulated X.25 packet 106, and associated CUG value, as an IP packet 109. Further, this operation 809 may also transmit the IP packet 109, and associated CUG value, as a protocol translated IP packet 109.

Figure 9:
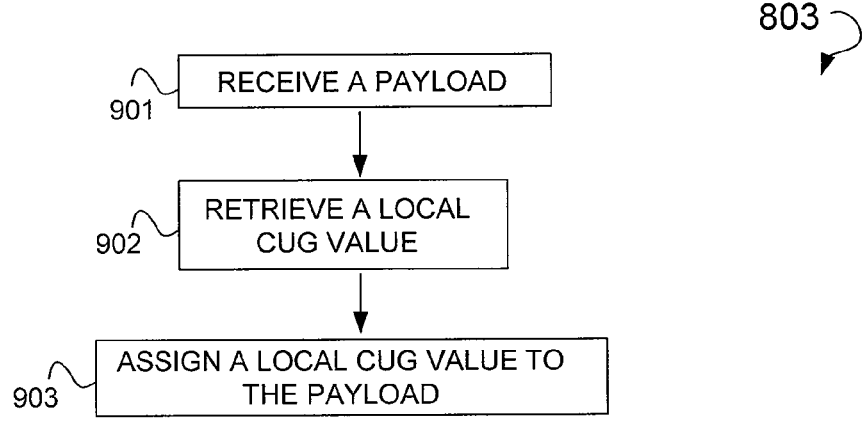
FIG. 9 is a flow chart illustrating a method, according to an example embodiment, for assigning a local CUG value to a payload.

FIG. 9 is a flow chart illustrating the execution of an example operation 803 that assigns a local CUG value to an X.25 packet 106. In some example embodiments, this operation 803 may be executed by the previously referenced CUG engine 206. An operation 901 may be executed to receive the X.25 packet 106. An operation 902 may be executed to retrieve a local CUG value from a lookup table (not pictured) including local CUG values. In some example cases, an algorithm may be executed that receives the X.25 packet 106 and processes (e.g., hashes) the X.25 packet to generate a local CUG value. An operation 903 may be executed to assign a local CUG value to the X.25 packet 106.

Figure 10:
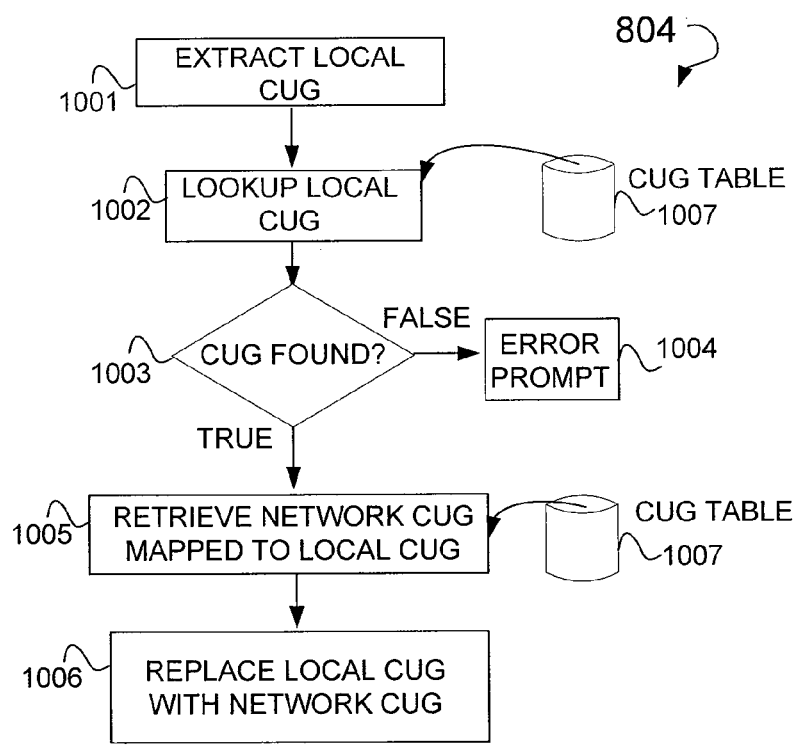
FIG. 10 is a flow chart illustrating a method, according to an example embodiment, for mapping the local CUG value provided in a payload to a network CUG value.

FIG. 10 is a flow chart illustrating an example operation 804. Shown is an operation 1001 that, when executed, extracts a local CUG value. An operation 1002 may be executed that looks up the local CUG value in a CUG table 1007. A decisional operation 1003 may be executed that identifies whether or not a CUG has been found.

In cases where a decisional operation 1003 evaluates as "false," an operation 1004 is executed that generates an error prompt that may, for example, be reviewed by a user utilizing the PIN-PAD device 101. In cases where a decisional operation 1003 evaluates as "true," an operation 1005 is executed. The operation 1005, when executed, may retrieve a network CUG value mapped to the local CUG value. This network CUG value may be retrieved from, for example, a CUG table 1007. An operation 1006 may also be executed that replaces the local CUG value with the network CUG value.

Figure 11:
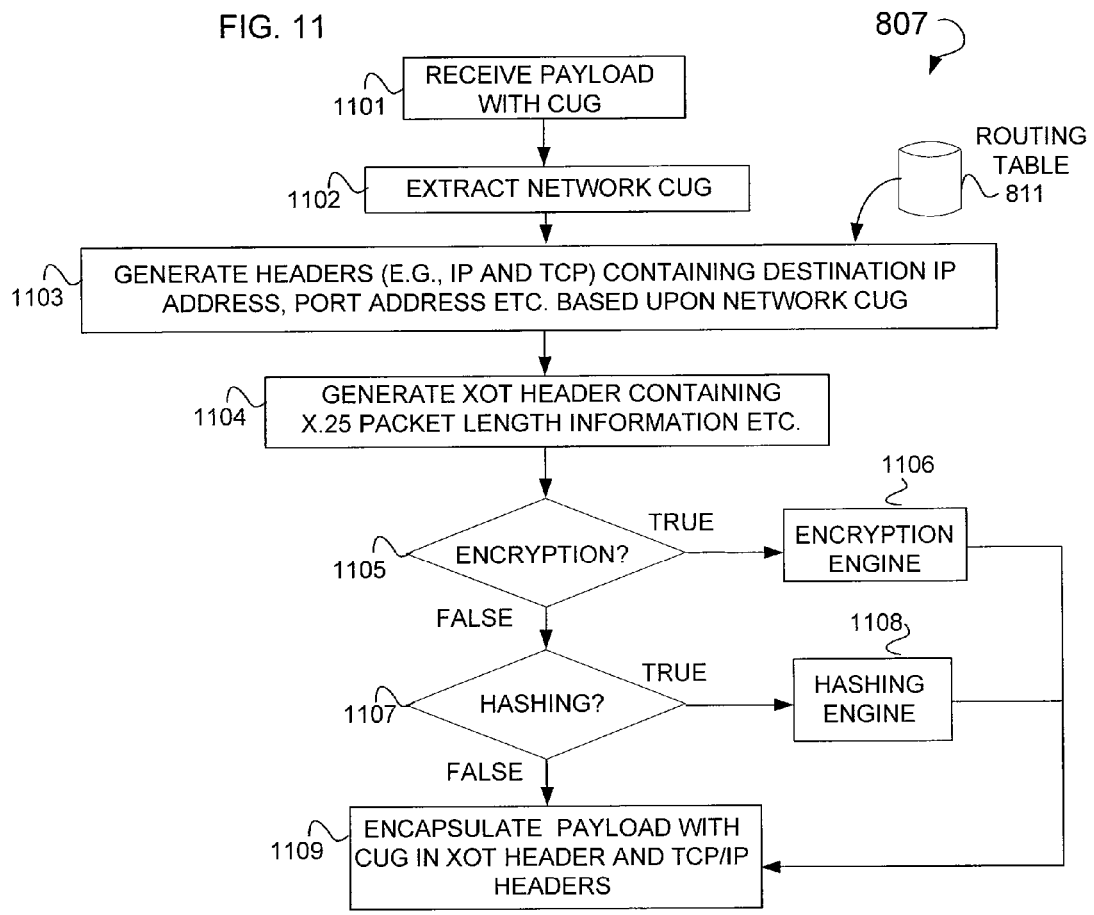
FIG. 11 is a flow chart illustrating a method, according to an example embodiment, for encapsulating an X.25 packet in a TCP header using an XOT engine.

FIG. 11 is a flow chart illustrating an example method used to execute operation 807. Shown is an operation 1101 that receives an X.25 packet 106 with a CUG value. An operation 1102 may be executed that extracts a network CUG value from this X.25 packet. An operation 1103 may be executed that generates a header or headers in the form of, for example, an IP, and/or a TCP header including a destination address IP address, port information, and other suitable information based upon the extracted network CUG value. These headers, and the information included therein, may be retrieved from, for example, a routing table 811.

In some example cases, an operation 1104 may be executed that generates an XOT header that may include, for example, an X.25 packet information, such as packet length information. In certain example cases, a decisional operation 1105 may be executed that identifies whether or not the X.25 packet is to be encrypted. In cases where a decisional operation 1105 evaluates as "true," and encryption engine 1106 is executed, the X.25 packet is encrypted.

In cases where a decisional operation 1105 evaluates as "false," a further decisional operation 1107 is executed. In cases where a decisional operation 1107 evaluates as "true," a hashing engine 1108 is executed that hashes the X.25 packet. In cases where a decisional operation 1107 evaluates as "false," an operation 1109 is executed. This operation 1109 may encapsulate the X.25 packet and associated CUG value, and XOT header, within an TCP/IP header(s). This process of encapsulating various header(s) within one another is illustrated in, for example, FIG. 3. Some example embodiments of this X.25 packet may be encrypted and hashed, hashed and encrypted, only encrypted, only hashed; alternately, some other suitable method of obscuring the data included within the X.25 packet may be utilized.

Some well known hashing algorithms include Message-Digest 5 (MD-5), Secure Hash Algorithm (SHA-1), while some well known symmetric encryption algorithms include Twofish, Serpent, Advanced Encryption Standard (AES), Blowfish, Carlisle Adams and Stafford Tavares 5 (CAST5), (Rivest Cipher 4) RC4, Triple Data Encryption Standard (TDES), and International Data Encryption Algorithm (IDEA). Some well known asymmetric encryption algorithms include Rivest, Shamir, Adleman (RSA), Diffie-Hellman, and Digital Signature Standard (DSS).

Figure 12:
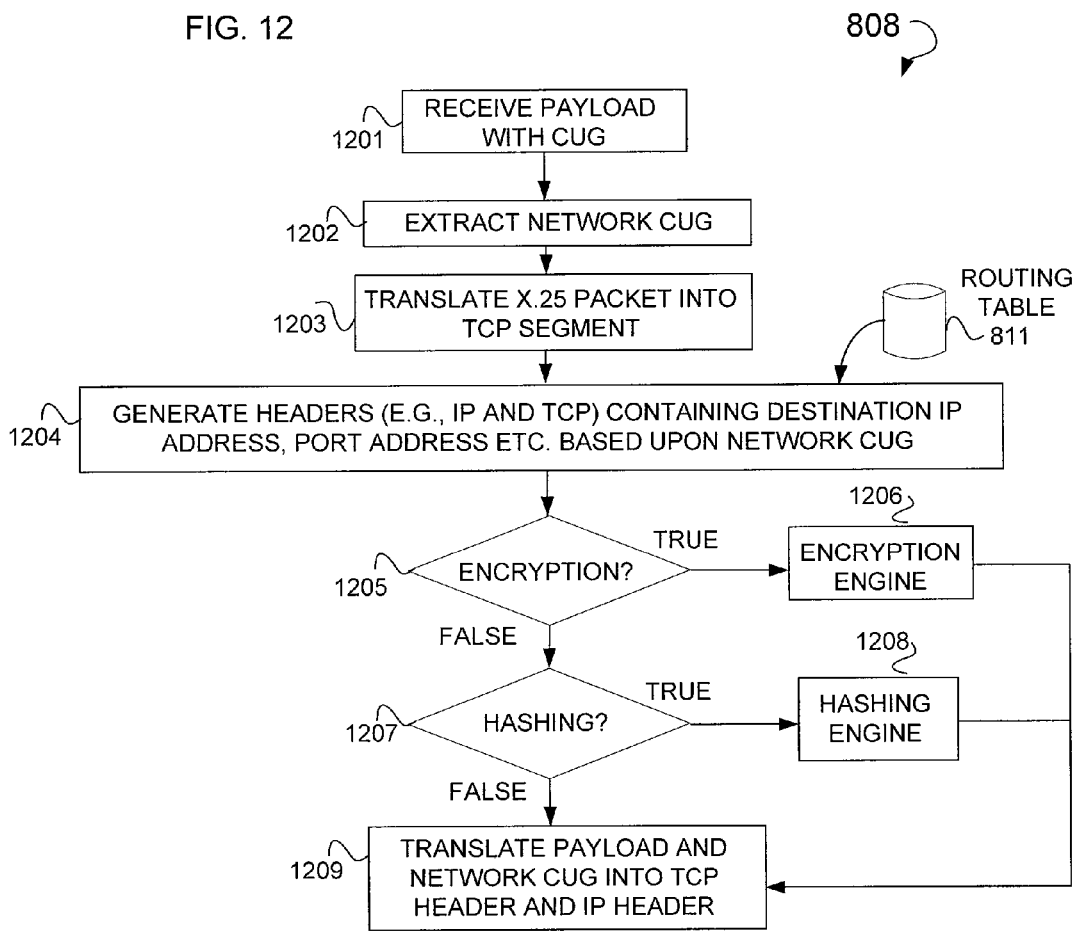
FIG. 12 is a flow chart illustrating a method, according to an example embodiment for translating an X.25 packet and associated CUG value into some other format.

FIG. 12 is a flow chart illustrating an example method used to execute operation 808. Shown is an operation 1201 that received a payload with an associated CUG value, where this payload may be, for example, the X.25 packet 106. An operation 1202 may be executed that extracts a network CUG value from this X.25 packet 106. An operation 1203 may be executed that translates the X.25 packet 106 into an equivalent TCP segment. An operation 1204 may then be executed that generates various headers, for example, IP/TCP headers including destination IP addresses, port information, and other suitable information based upon the extracted network CUG value.

This information included within the IP and TCP headers (e.g., the IP address, port information etc.) may be retrieved from, for example, a routing table 811. In certain example embodiments, some form of obsfucation may be implemented such as encryption or hashing. Shown is a decisional operation 1205 that identifies whether or not the TCP segment is to be encrypted. Cases where decision operation 1205 evaluates as "true," a further encryption engine 1206 may be executed to encrypt the data included within the TCP segment.

In cases where decisional operation 1205 evaluates as "false," a decisional operation 1207 may be executed. This decisional operation 1207 may identify whether or not the TCP segment is to be hashed. In cases where decisional operation 1207 evaluates as "true," an operation 1208 may be executed that hashes the TCP segment including the X.25 packet. In cases where a decisional operation 1207 evaluates as "false," an operation 1209 may be executed that translates the payload and associated network CUG value into an equivalent TCP header (e.g., a TCP segment) and IP header. The general structure of a payload that is translated, and its associated protocols, is reflected in FIG. 4. Further, in some example embodiments, this payload included within the TCP segment after translation may be encrypted, encrypted and hashed, hashed and encrypted, or hashed only.

Figure 13:
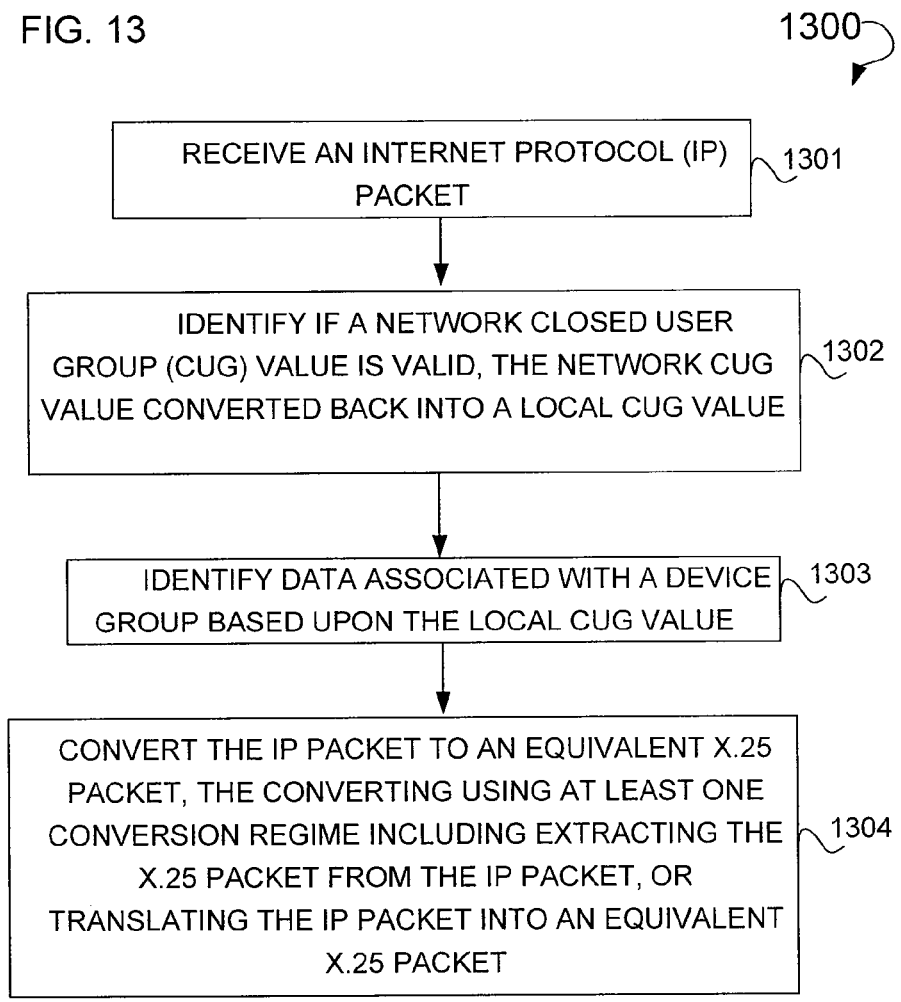
FIG. 13 is a flow chart illustrating a method, according to an example embodiment, used to receive and convert an IP packet to an equivalent X.25 packet.

FIG. 13 is a flow chart illustrating an example method 1300 used to receive and convert an IP packet to an equivalent X.25 packet. Shown is a method 1300 including operations 1301 through 1304. These operations may be carried out by the DCE 102, DCE 104, the X.25 DTE server 110, or some other suitable device. Illustrated is an operation 1301 that, when executed, receives an IP packet. An operation 1302 may be executed that identifies if a network CUG value contained within the IP packet is valid. The network CUG value may be converted back into a local CUG value. This local CUG value may be an appropriate CUG value, and may not be the same local CUG value as previously utilized. Operation 1303 may be executed to identify data associated with a device group based upon the network CUG value. Additionally, an operation 1304 may be executed that converts the IP packet to an equivalent X.25 packet. The converting may include using at least one conversion regime including extracting the X.25 packet from the IP packet, or translating the IP packet into an equivalent X.25 packet. In some example embodiments, the data includes financial data. This financial data may be in the form of a credit card number, PIN number, expiration date, or some other suitable information able to validate a financial transaction.

FIG. 14 is a flow chart illustrating an example method 1400 showing the switch from a primary interface such as the ADSL Interface 211 to a backup interface such as the ISDN Interface 212, or ISDN Interface 213. Illustrated is an operation 1401 that, when executed, detects a primary interface. This primary interface may be, for example, a fast ADSL interface (see e.g., ADSL Interface 211). A decisional operation 1402 may be executed that identifies whether or not an interface failure has occurred. Specifically, in the same example embodiments, decisional operation 1402 may identify whether or not the primary interface has failed.

In cases where a decisional operation 1402 evaluates as "false," the previously illustrated operation 1401 may be executed. In cases where decisional operation 1402 evaluates as "true," an operation 1403 may be executed. This operation 1403, when executed, may facilitate a switch from a primary interface to a backup interface such as an ISDN interface (see e.g., ISDN interface 212 and ISDN interface 213).

In some example embodiments, this switch from a primary interface to a backup interface is between two layer 2 interfaces. An operation 1404 may be executed that detects whether or not a primary interface is available. In the course of detecting whether a primary interface is available, a decisional operation 1405 may be executed. This decisional operation 1405 detects whether or not a primary interface is available. In cases where a decisional operation 1405 evaluates as "false," the operation 1404 is re-executed. In cases where a decisional operation 1405 evaluates as "true," an operation 1406 is executed that switches to the primary interface from the secondary interface. Upon the successful execution of operation 1406, the previously shown operation 1401 is re-executed.

Some example embodiments may utilize the OSI model, or TCP/IP stack model for defining the protocols used by a network to transmit data. In applying these models, a system of data transmission between a server and client, or between peer computer systems, is illustrated as a series of approximately five layers comprising: an application layer, a transport layer, a network layer, a data link layer, and a physical layer. In examples of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data is transmitted over a network such as an Internet, Local Area Network (LAN), Wide Area Network (WAN), or some other suitable network. In some examples, Internet refers to a network of interconnected computer networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

In some example embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data that cause a general-purpose computer system or special-purpose computer system to perform a certain function or group of functions. The computer-executable or computer-readable instructions may be, for example, binaries, or intermediate format instructions such as assembly language, or even source code.

As shown herein, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device where internal modules (e.g., a processor and memory) work together to perform operations on electronic data.

In some example embodiments, the method and device may be practiced in network computing environments with many types of computer system configurations, including hubs, routers, wireless Access Points (APs), wireless stations, personal computers, laptop computers, hand-held devices, multi-processor systems, microprocessor-based or programmable consumer electronics, network PCs, minicomputers, mainframe computers, mobile telephones, and the like. The method and device can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

FIG. 15 shows a diagrammatic representation of a machine in the example form of a computer system 1500 within which a set of instructions, for causing the machine to perform any one or more of the methodologies discussed herein, may be executed. In alternative example embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a web appliance, a network router, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a Central Processing Unit (CPU), a Graphics Processing Unit (GPU) or both), a main memory 1501 and a static memory 1506, which communicate with each other via a bus 1508. The computer system 1500 may further include a video display unit 1510 (e.g., a LCD or a CRT). The computer system 1500 also includes an alphanumeric input device 1517 (e.g., a keyboard), a user interface (UI) cursor controller 1511 (e.g., a mouse), a disk drive unit 1516, a signal generation device 1514 (e.g., a speaker) and a network interface device (e.g., a transmitter) 1520.

The disk drive unit 1516 includes a machine-readable medium 1522 on which is stored one or more sets of instructions and data structures (e.g., software) 1521 embodying or utilized by any one or more of the methodologies or functions illustrated herein. The software may also reside, completely or at least partially, within the main memory 1501 and/or within the processor 1502 during execution thereof by the computer system 1500, the main memory 1501 and the processor 1502 also constituting machine-readable media.

The instructions 1521 may further be transmitted or received over a network 1526 via the network interface device 1520 using any one of a number of well-known transfer protocols (e.g., Hyper-Text Transfer Protocol (HTTP), a File Transfer Protocol (FTP), or a True File Transfer Protocol (TFTP)).

While the machine-readable medium 1522 is shown in an example embodiment to be a single medium, the term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that cause the machine to perform any one or more of the methodologies of the present method and device, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

It is to be understood that the above description is intended to be illustrative, and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the method and device should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving an X.25 packet at a Local Area Network (LAN) interface of a network device;
identifying if a local Closed User Group (CUG) value is associated with the X.25 packet, the local CUG value identifying a device associated with a device group from which the X.25 packet was received;
if a local CUG value is not associated with the X.25 packet, processing the X.25 packet with a hash mechanism to generate the local CUG value and associating the generated local CUG value with the X.25 packet;
replacing the local CUG value associated with the X.25 packet with a network CUG value associated with the X.25 packet, the network CUG value being used to identify the X.25 packet as associated with a domain and to control access of the X.25 packet to an X.25 network associated with the domain; and
formatting the X.25 packet and the associated network CUG value to generate an IP packet, the IP packet including a plurality of TCP/IP header values generated based on the associated network CUG value.

2. The method of claim 1, wherein the formatting of the X.25 packet and the associated network CUG value includes the use of at least one formatting regime including encapsulating the X.25 packet, that includes the associated network CUG value, in an X.25 Over a Transmission Control Protocol packet (XOT), or using protocol translation to translate the X.25 packet that includes the network CUG value into an equivalent IP packet, and the method further comprises:
transmitting the IP packet using a Wide Area Network (WAN) interface card, the WAN interface card including a primary interface, and at least one backup interface.

3. The method of claim 2, wherein the protocol translation includes mapping at least one field in an X.25 header to at least one equivalent field in an IP header.

4. The method of claim 2, wherein the WAN interface card includes at least two disparate WAN interfaces comprising disparate access technologies including at least two of the following: Asymmetric Digital Subscriber Line (ADSL), ADSL2, ADSL2+, Data Over Cable Service Interface Specification (DOCSIS), a Very High Speed Digital Subscriber Line (VDSL) or an Integrated Services Digital Network (ISDN).

5. The method of claim 4, wherein the two or more disparate WAN interfaces are included in the same interface card.

6. The method of claim 1, wherein the LAN interface is an Integrated Services Digital Network (ISDN)-Network Terminating (ISDN-NT) interface.

7. The method of claim 1, wherein the X.25 packet includes financial data.

8. The method of claim 1, further comprising mapping the local CUG value, associated with the X.25 packet, to the network CUG value by accessing stored values that relate the local CUG value to the network CUG value.

9. The method of claim 1, wherein the device group includes a point of sale device.

10. The method of claim 1, wherein access of the X.25 packet to the X.25 network associated with the domain is provided by replacing the network CUG value with an equivalent local CUG value for the X.25 network associated with the domain, the equivalent local CUG value being different from the local CUG value.

11. The method of claim 1, further comprising:
transmitting the IP packet to a second network device;
receiving the IP packet at the second network device;
converting the IP packet at the second network device back into an equivalent X.25 packet by replacing the network CUG value with an equivalent local CUG value that is used to control access of the equivalent X.25 packet to the X.25 network associated with the domain, the equivalent local CUG value being different from the local CUG value; and
transmitting the equivalent X.25 packet from an interface of the second network device to the X.25 network associated with the domain.

12. A method comprising:
receiving an Internet Protocol (IP) packet, the IP packet including a network Closed User Group (CUG) value corresponding to a local CUG value associated with the X.25 packet from which the IP packet was created, the local CUG value being generated by an intermediate device that processes the X.25 packet with a hash mechanism if the intermediate device determines that the X.25 packet did not include a local CUG value, and the IP packet further including a plurality of TCP/IP header values generated based on the network CUG value;

identifying, using at least one processor, if the network CUG value contained within the IP packet is valid and, if the network CUG value is valid, converting the network CUG value into another local CUG value that is the same as or different from the local CUG value associated with the X.25 packet from which the IP packet was created and that corresponds to an X.25 device group from which a payload of the IP packet was received; and identifying, based upon the another local CUG value, data associated with the X.25 device group.

13. The method of claim 12, further comprising converting the IP packet to an equivalent X.25 packet, the converting using a conversion regime including at least one of extracting the X.25 packet from the IP packet, or translating the IP packet into the equivalent X.25 packet.

14. The method of claim 12, wherein the data includes financial data.

15. The method of claim 12, wherein the X.25 device group from which the payload of the IP packet was received is associated with an original local CUG value that is equivalent to the local CUG value for access of a corresponding X.25 packet that includes the payload to a corresponding X.25 network, the original local CUG value being different from the local CUG value.

16. A network device comprising:
at least one processor;
a receiver to receive an X.25 packet m a Local Area Network (LAN) interface of the network device;
a determination engine, executing on the at least one processor, to identify if a local Closed User Group (CUG) value is associated with the X.25 packet, the local CUG value identifying a device associated with a device group from which the X.25 packet was received;
an assignment engine, executing on the at least one processor, to associate the local CUG value with the X.25 packet, if a local CUG value is not associated with the X:25 packet, by processing the X.25 packet with a hash mechanism to generate the local CUG value and associating the generated local CUG value with the X.25 packet;
a CUG engine, executing on the at least one processor, to replace the local CUG value associated with the X.25 packet with a network CUG value associated with the X.25 packet, the network CUG value being used to identify the X.25 packet as associated with a domain and to control access of the X.25 packet to an X.25 network associated with the domain; and
an X.25 Over a Transmission Control Protocol packet (XOT)/Protocol Translation module, executing on the at least one processor, to format the X.25 packet and the associated network CUG value to generate an IP packet, the IP packet including a plurality of TVP/IP header values generated based on the associated network CUG value.

17. The network device of claim 16, further comprising:
a transmitter to transmit the IP packet by using a Wide Area Network (WAN) interface card, the WAN interface card including a primary interface, and at least one backup interface, wherein
the X.25 XOT/Protocol Translation module uses at least one formatting regime including encapsulation of the X.25 packet that includes the associated network CUG value in XOT, or protocol translation to translate the X.25 packet that includes the associated network CUG value into an equivalent IP packet.

18. The network device of claim 17, wherein the protocol translation includes a mapping of at least one field in an X.25 header to at least one equivalent field in an IP header.

19. The network device of claim 17, wherein the WAN interface card includes at least two or more disparate WAN interfaces comprising disparate access technologies including at least two or more of the following: Asymmetric Digital Subscriber Line (ADSL), ADSL2, ADSL2+, Data Over Cable Service Interface Specification (DOCSIS), a Very High Speed Digital Subscriber Line (VDSL), or an Integrated Services Digital Network (ISDN).

20. The network device of claim 19, wherein the two or more disparate WAN interfaces are included in the same interface card.

21. The network device of claim 16, wherein the LAN interface is an Integrated Services Digital Network (ISDN)-Network Terminating (ISDN-NT) interface.

22. The network device of claim 16, wherein the network device includes a router.

23. The network device of claim 16, further comprising a mapping engine, executing on the at least one processor, to map the local CUG value, associated with the X.25 packet, to the network CUG value by accessing stored values that relate the local CUG value to the network CUG value.

24. The network device of claim 16, wherein the device group includes a point of sale device.

25. A network device comprising:
at least one processor;
a receiver to receive an Internet Protocol (IP) packet, the IP packet including a network Closed User Group (CUG) value corresponding to a local CUG value associated with the X.25 packet from which the IP packet was created, the local CUG value being generated by an intermediate device that processes the X.25 packet with a hash mechanism if the intermediate device determines that the X.25 packet did not include a local CUG value, and the IP packet further including a plurality of TCP/IP header values generated based on the network CUG value;
a CUG engine, executing on the at least one processor, to identify if the network CUG value contained within the IP packet is valid and, if the network CUG value is valid, converting the network CUG value into another local CUG value that is the same as or different from the local CUG value associated with the X.25 packet from which the IP packet was created and that corresponds to an X.25 device group from which a payload of the IP packet was received; and
a validation engine, executing on the at least one processor, to identify, based upon the another local CUG value, data associated with the X.25 device group.

26. The network device of claim 25, further comprising a conversion module, executing on the at least one processor, to convert the IP packet to an equivalent X.25 packet, the conversion using a conversion regime including at least one of extracting the equivalent X.25 packet from the IP packet, or translating the IP packet into the equivalent X.25 packet.

27. The network device of claim 25, wherein the data includes financial data.

28. An apparatus comprising:
means for receiving an X.25 packet at a Local Area Network (LAN) interface of a network device;
means for identifying if a local Closed User Group (CUG) value is associated with the X.25 packet, the local CUG value identifying a device associated with a device group from which the X.25 packet was received;

means for processing the X.25 packet with a hash mechanism, if a local CUG value is not associated with the X.25 packet, to generate the local CUG value and to associate the generated local CUG value with the X.25 packet;

means for replacing the local CUG value associated with the X.25 packet with a network CUG value associated with the X.25 packet, the network CUG value being used to identify the X.25 packet as associated with a domain and to control access of the X.25 packet to an X.25 network associated with the domain; and means for formatting the X.25 packet and the associated network CUG value to generate an IP packet, the IP packet including a plurality of TCP/IP header values generated based on the associated network CUG value.

29. Logic encoded in one or more non-transitory machine readable media for execution and that, when executed by a network device, causes the network device to:

receive an X.25 packet at a Local Area Network (LAN) interface of a network device;

identify if a local Closed User Group (CUG) value is associated with the X.25 packet, the local CUG value identifying a device associated with a device group from which the X.25 packet was received;

if a local CUG value is not associated with the X.25 packet, process the X.25 packet with a hash mechanism to generate the local CUG value and associate the generated local CUG value with the X.25 packet;

replace the local CUG value with a network CUG value associated with the X.25 packet, the network CUG value being used to identify the X.25 packet as associated with a domain and to control access of the X.25 packet to an X.25 network associated with the domain; and format the X.25 packet and the associated network CUG value to generate an IP packet, the IP packet including a plurality of TCP/IP header values generated based on the associated network CUG value.

* * * * *

UNITED STATES PATENT AND TRADEMARK OFFICE
CERTIFICATE OF CORRECTION

PATENT NO. : 8,391,293 B2  
APPLICATION NO. : 12/023823  
DATED : March 5, 2013  
INVENTOR(S) : Srinivasan et al.

Page 1 of 1

It is certified that error appears in the above-identified patent and that said Letters Patent is hereby corrected as shown below:

In the Claims

In column 15, line 31, in claim 16, delete "m" and insert --at--, therefor

In column 15, line 41, in claim 16, delete "X:25" and insert --X.25--, therefor

In column 15, line 56, in claim 16, delete "TVP/IP" and insert --TCP/IP--, therefor Signed and Sealed this  
Twenty-sixth Day of November, 2013

Margaret A. Focarino  
*Commissioner for Patents of the United States Patent and Trademark Office*